United States Patent
Jandhyala et al.

(10) Patent No.: US 11,286,726 B2
(45) Date of Patent: Mar. 29, 2022

(54) METHOD TO ATTAIN FULL ANNULAR COVERAGE DURING CEMENTING OR MUD CIRCULATION

(71) Applicant: HALLIBURTON ENERGY SERVICES, INC., Houston, TX (US)

(72) Inventors: Siva Rama Krishna Jandhyala, Pune (IN); Sunita Kadam, Pune (IN); Rahul Chandrakant Patil, Pune (IN); Wiliam W. Shumway, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 272 days.

(21) Appl. No.: 16/618,886

(22) PCT Filed: Jan. 7, 2019

(86) PCT No.: PCT/US2019/012523
§ 371 (c)(1),
(2) Date: Dec. 3, 2019

(87) PCT Pub. No.: WO2020/145936
PCT Pub. Date: Jul. 16, 2020

(65) Prior Publication Data
US 2021/0363836 A1    Nov. 25, 2021

(51) Int. Cl.
*E21B 17/10*    (2006.01)
*E21B 33/14*    (2006.01)
(Continued)

(52) U.S. Cl.
CPC .......... *E21B 17/1042* (2013.01); *C09K 8/422* (2013.01); *C09K 8/5083* (2013.01); *E21B 33/14* (2013.01)

(58) Field of Classification Search
CPC .......... C09K 8/5083; C09K 8/50; C09K 8/42; C09K 8/422; E21B 33/13; E21B 33/14; E21B 17/10; E21B 17/105; E21B 17/1042
See application file for complete search history.

(56) References Cited

U.S. PATENT DOCUMENTS

2004/0261990 A1    12/2004   Bosma et al.
2007/0056735 A1     3/2007   Bosma et al.
(Continued)

FOREIGN PATENT DOCUMENTS

CA    2508498 A1 * 11/2005   ........... E21B 43/108
EP    1793078 A1 *  6/2007   ......... E21B 33/1208
(Continued)

OTHER PUBLICATIONS

International Search Report and Written Opinion issued in PCT Application No. PCT/US2019/012523, dated Oct. 7, 2019.

*Primary Examiner* — Angela M DiTrani Leff
(74) *Attorney, Agent, or Firm* — McAfee & Taft (57) ABSTRACT

Methods and systems are directed to the uniform distribution of a fluid through an annulus between a pipe and a wellbore wall, primarily when there is a preferential flow in one side of the annulus relative to another side of the annulus. Generally, the methods and systems involve introducing a first agent into the annulus, wherein the first agent is configured to cause swelling of a cladding on the exterior of the section of the pipe. The swelling reduces flow in the annulus on the side of the pipe with preferential flow so as to reduce the preferential flow on that side of the pipe.

14 Claims, 7 Drawing Sheets

(51) Int. Cl.
*C09K 8/42* (2006.01)
*C09K 8/508* (2006.01)

(56) References Cited

U.S. PATENT DOCUMENTS

| | | |
|---|---|---|
| 2008/0000646 A1 | 1/2008 | Thomson |
| 2009/0120640 A1* | 5/2009 | Kulakofsky ............ E21B 33/14 |
| | | 166/295 |
| 2013/0126185 A1 | 5/2013 | Mazyar |
| 2016/0108698 A1* | 4/2016 | Alvarez ................. E21B 33/14 |
| | | 166/285 |
| 2017/0138149 A1* | 5/2017 | Muthusamy .......... C08F 220/68 |

FOREIGN PATENT DOCUMENTS

| | | | |
|---|---|---|---|
| EP | 1978071 A1 * | 10/2008 | ............ C09K 8/422 |
| WO | 2006079659 A1 | 8/2006 | |
| WO | 2016053237 A1 | 4/2016 | |
| WO | 2017048222 A1 | 3/2017 | |
| WO | WO-2018169654 A1 * | 9/2018 | ............... C09K 8/44 |

* cited by examiner

METHOD TO ATTAIN FULL ANNULAR COVERAGE DURING CEMENTING OR MUD CIRCULATION

FIELD

The present disclosure relates generally to downhole operations for subterranean formations, more specifically, to operations relating to flowing fluids through an annulus between a pipe and the wellbore wall.

BACKGROUND

In downhole operations involving circulation of fluids through an annulus between a pipe and borehole wall, the pipe is sometimes not centered in the wellbore. This condition can create a bad standoff section where the annulus between the pipe and the wellbore wall is narrower on one side of the pipe than the other. In more severe situations, bad standoff sections do not allow sufficient fluid flow through the narrower side for sufficient coverage of the fluid, and in some cases, there may be no fluid flow through the narrower side.

For example, in operations for cementing a casing in the well, the bad standoff section may result in no cement flow or a reduced cement flow through the narrower side. Thus, the narrower side is poorly covered with the cement. In some cementing cases, the narrower side can even be left uncemented. Additionally, in mud circulation operations, mud flows down the drill pipe or drill string and then up the annulus. However, in such operations bad standoff sections can result in little or no mudflow in the narrower section.

One conventional solution has been to increase the centralizer frequency or to optimize the type of centralizers to obtain better standoffs. However, this approach may cause difficulties in running the pipe or casing, and in some cases—like horizontal wells—may not provide any appreciable remedy.

BRIEF DESCRIPTION OF THE DRAWINGS

The drawings included with this application illustrate certain aspects of the embodiments described herein. However, the drawings should not be viewed as exclusive embodiments. The subject matter disclosed herein is capable of considerable modifications, alterations, combinations, and equivalents in form and function, as will be evident to those skilled in the art with the benefit of this disclosure.

FIG. 6 is a schematic representation of the wellbore of FIGS. 3-5 showing an embodiment where the well-treatment fluid acts as the de-swelling agent.

DETAILED DESCRIPTION

The present disclosure may be understood more readily by reference to this detailed description, including the figures. For simplicity and clarity of illustration, where appropriate, reference numerals may be repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may have been exaggerated to better illustrate details and features of the present disclosure.

In the following description, the terms "upper," "upward," "uphole," "lower," "downward," "below," "downhole" and the like, as used herein, shall mean: in relation to the bottom or furthest extent of the surrounding wellbore even though the well or portions of it may be deviated or horizontal. Where components of relatively well-known designs are employed, their structure and operation will not be described in detail. One of ordinary skill in the art will appreciate the many possible applications and variations of the present methods and systems based on the following description.

This disclosure provides for systems and methods which result in uniform distribution of a fluid through an annulus between a pipe and a wellbore wall, primarily when there is a preferential flow in one side of the annulus relative to another side of the annulus. The systems and methods are generally applicable in operations where a uniform coverage of a fluid is desirable and there is a preferential flow for one side of the annulus, especially when the preferential flow is caused by a section of the pipe not being centered in the annulus. As used herein, the term "preferential flow" simply refers to the tendency for more fluid to flow on one side of the annulus than the other and does not necessarily reflect a desired outcome. For example, the systems and methods may be used in operations for cementing a casing in a wellbore or for mud circulation operations, such as drilling. As used herein, "pipe" generally refers to any tubular downhole system where fluid can flow up or down through the annulus between the pipe and the wellbore wall. For cementing operations, the pipe is typically referred to as a casing, and for drilling operations, the pipe is typically referred to as a drill string or drill pipe.

Figure 1:
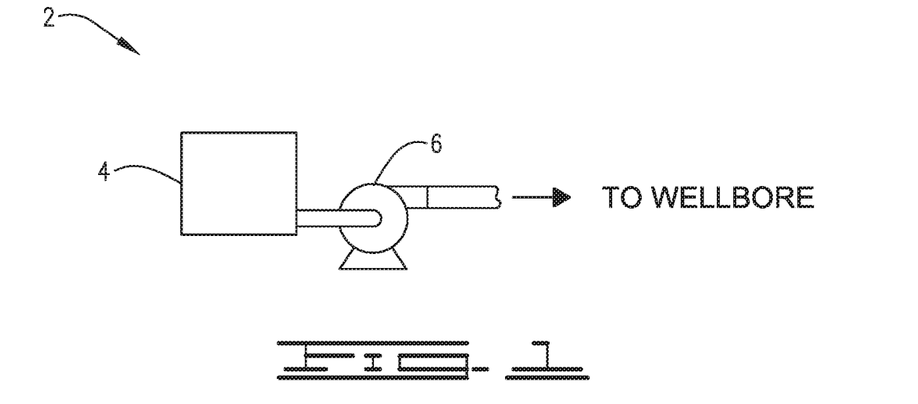
FIG. 1 illustrates a system for preparation and delivery of a cement composition to a wellbore in accordance with aspects of the present disclosure.
Figure 2:
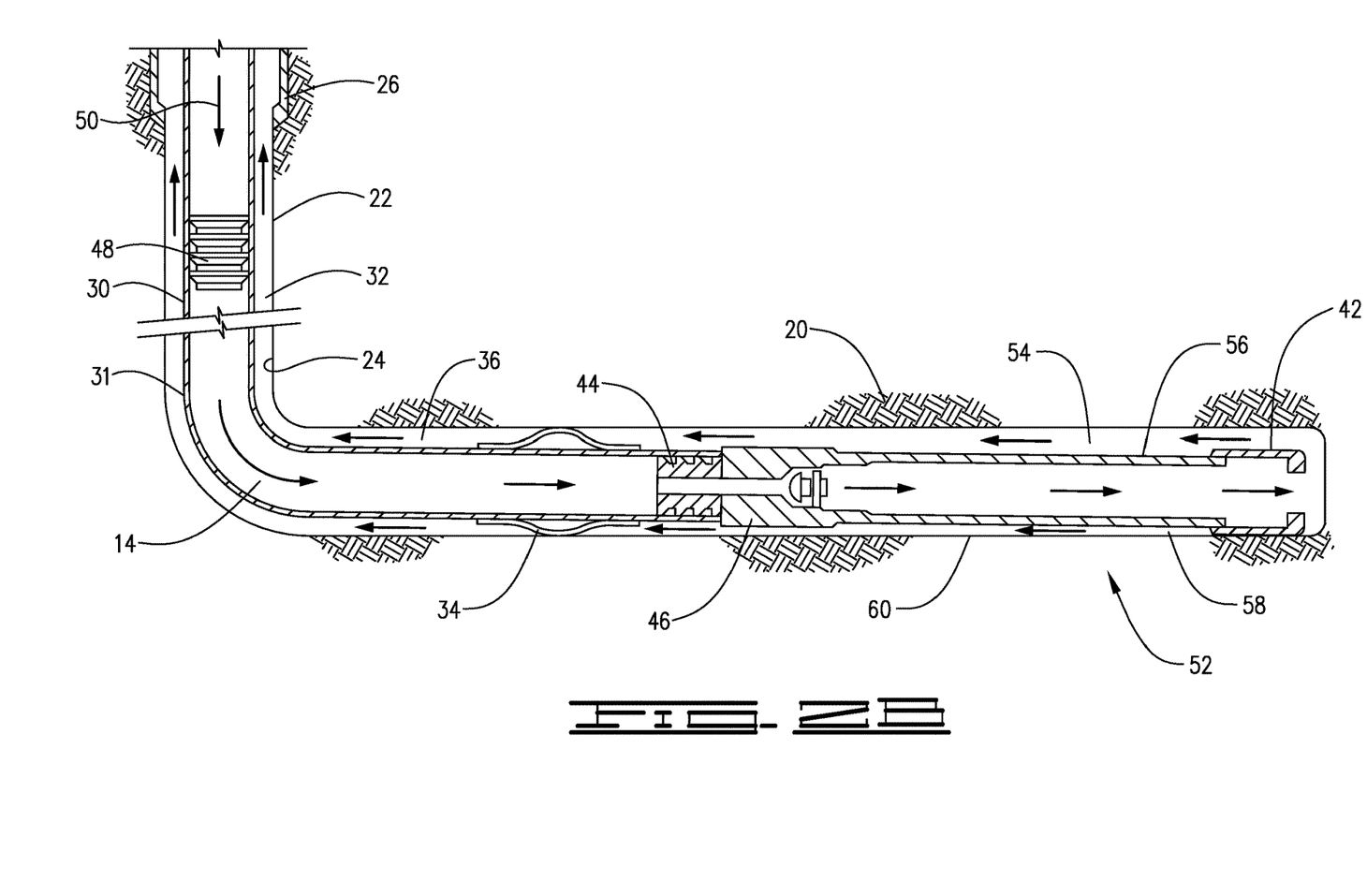
FIG. 2A illustrates surface equipment that may be used in placement of a cement composition in a wellbore in accordance with aspects of the present disclosure.
FIG. 2B illustrates surface placement of a cement composition into a wellbore annulus.
Figure 2A:
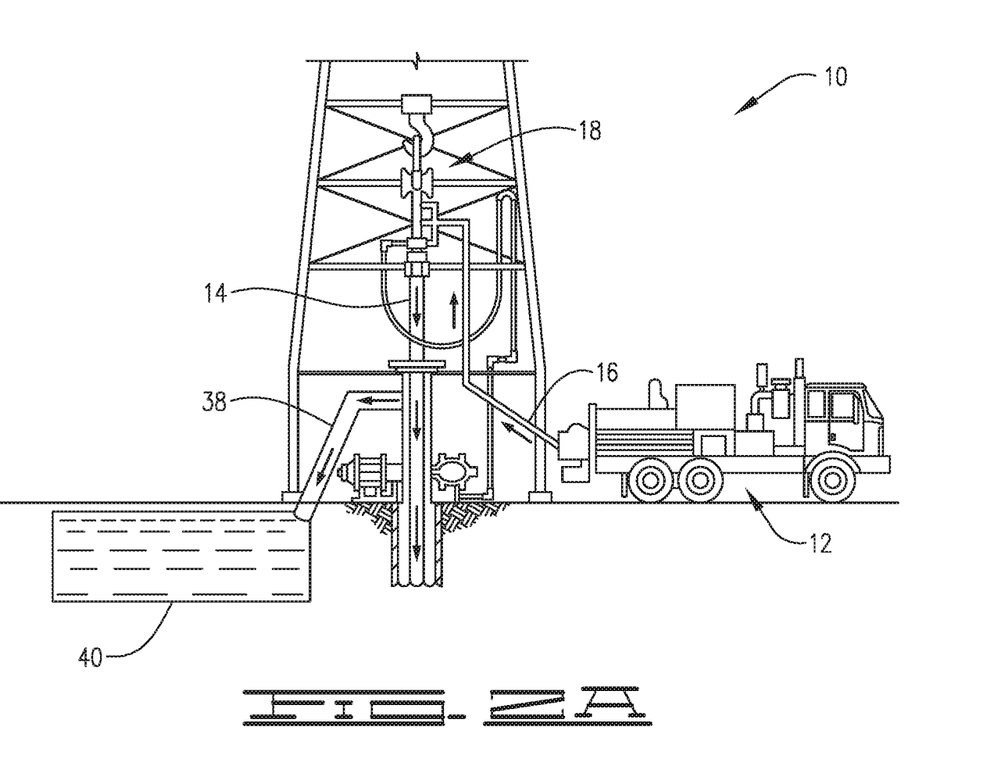

To better explain the nature of such bad standoff sections of downhole pipes, a representative casing system and its operation are described in relation to FIGS. 1, 2A and 2B. However, those skilled in the art will realize that bad standoff sections can occur in other operations—such as drilling operations—and the principles and methods described below are not limited to casing operations.

Referring now to FIG. 1, a system that may be used in association with example embodiments disclosed herein will now be described. FIG. 1 illustrates a system 2 for preparation of a cement composition and delivery to a wellbore in accordance with certain embodiments. As shown, the cement composition may be mixed in mixing equipment 4, such as a jet mixer, re-circulating mixer, or a batch mixer, for example, and then pumped via pumping equipment 6 to the wellbore. In some embodiments, the mixing equipment 4 and the pumping equipment 6 may be disposed on one or more cement trucks as will be apparent to those of ordinary skill in the art. In some embodiments, a jet mixer may be used, for example, to continuously mix the composition, including water, as it is being pumped to the wellbore.

An example technique and system for placing a cement composition into a subterranean formation will now be described with reference to FIGS. 2A and 2B. FIG. 2A illustrates surface equipment 10 that may be used in placement of a cement composition in accordance with certain embodiments. It should be noted that while FIG. 2A generally depicts a land-based operation, those skilled in the art will readily recognize that the principles described herein are equally applicable to subsea operations that employ floating or sea-based platforms and rigs, without departing from the scope of the disclosure. As illustrated by FIG. 2A, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. The cementing unit 12 may pump a cement composition 14 through a feed pipe 16 and to a cementing head 18 which conveys the cement composition 14 downhole. Additionally, the cementing unit 12 can be configured to pump one or more agents (such as an acid or base solution) downhole either concurrently or alternatively with the cement.

Turning now to FIG. 2B, the cement composition 14 may be placed into a subterranean formation 20 in accordance with example embodiments. As illustrated, a wellbore 22 may be drilled into the subterranean formation 20. Wellbore 22 is depicted as a horizontal wellbore, i.e., having a vertical section extending from the surface with a horizontal section extending from the vertical section. While the principles described herein can be used with wellbores extending generally vertically, the principles described may be more commonly used with wellbores that extend at an angle through the subterranean formation 20, such as horizontal (as shown) and slanted wellbores. As illustrated, the wellbore 22 comprises walls 24. In the illustrated embodiments, a surface casing 26 has been inserted into the wellbore 22. The surface casing 26 may be cemented to the walls 24 of the wellbore 22 by a cement sheath. In the illustrated embodiment, one or more additional conduits (e.g., intermediate casing, production casing, liners, etc.) shown here as casing 30 may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation. As can be seen, while centralizers 34 may be used there can still be sections of the casing which are not centralized, such as standoff section 52. At standoff section 52, the portion 54 of annulus 32 on a first side 56 of casing 30 is larger than the portion 58 of annulus 32 on a second side 60 of casing 30. Because the width for annulus portion 54 is wider than the width of annulus portion 58, fluids preferentially flow through portion 54 of the annulus 32 relative to portion 58 of the annulus 32. Generally, portion 54 will be referred to herein as "wider annulus portion 54," and portion 58 will be referred to as "narrower annulus portion 58."

With continued reference to FIG. 2B, the cement composition 14 may be pumped down the interior of the casing 30. The cement composition 14 may be allowed to flow down the interior of the casing 30 through the casing shoe 42 at the bottom of the casing 30 and up around the casing 30 into the wellbore annulus 32. The cement composition 14 may be allowed to set in the wellbore annulus 32, for example, to form a cement sheath that supports and positions the casing 30 in the wellbore 22. As will be appreciated, narrower annulus portion 58, as well as some portion downstream therefrom, may have little or no cement coverage and thus the casing 30 may not be properly supported at this location. While not illustrated, other techniques may also be utilized for introduction of the cement composition 14. By way of example, reverse circulation techniques may be used that include introducing the cement composition 14 into the subterranean formation 20 by way of the wellbore annulus 32 instead of through the casing 30. Those skilled in the art will appreciate that techniques such as reverse circulation may not resolve the non-uniform cement coverage resulting from standoff section 52.

As it is introduced, the cement composition 14 may displace other fluids 36, such as drilling fluids and/or spacer fluids, which may be present in the interior of the casing 30 and/or the wellbore annulus 32. More particularly for the methods of this disclosure, the cement may replace an agent introduced downhole, such as a swelling agent as discussed below. At least a portion of the displaced fluids 36 may exit the wellbore annulus 32 via a flow line 38 and be deposited, for example, in one or more retention pits 40 (e.g., a mud pit), as shown on FIG. 2A. Referring again to FIG. 2B, a bottom plug 44 may be introduced into the wellbore 22 ahead of the cement composition 14, for example, to separate the cement composition 14 from the fluids 36 that may be inside the casing 30 prior to cementing. After the bottom plug 44 reaches the landing collar 46, a diaphragm or other suitable device ruptures to allow the cement composition 14 through the bottom plug 44. In FIG. 2B, the bottom plug 44 is shown on the landing collar 46. In the illustrated embodiment, a top plug 48 may be introduced into the wellbore 22 behind the binder composition 14. The top plug 48 may separate the cement composition 14 from a displacement fluid 50 and also push the cement composition 14 through the bottom plug 44.

To rectify non-uniform fluid flow through the annulus in the above described casing operation and in other operations having bad standoff sections, such as mud circulation operations, the method of this disclosure generally comprises introducing a swelling agent into the annulus, wherein the swelling agent is configured to cause swelling of a cladding on the exterior of the section of the pipe. The method has particular application where the section of pipe with the cladding is located at a bad standoff section, i.e., where the pipe is not centered so that a wider annulus portion is present on one side of the pipe than the other side of the pipe. In such situations, the side with the wider annulus portion normally receives preferential flow of fluid relative to the side with the narrower annulus portion; however, this preferential flow means that the swelling agent contacts and causes to swell the cladding in the wider annulus more than the narrower annulus portion. The swelling of the cladding thus narrows the wider annulus portion so that preferential flow is switched to the narrower annulus portion. A well-treatment fluid, such as cement or mud, can then be introduced so as to flow substantially equally through both the wider and narrower annulus portions or to flow preferentially through the narrower annulus portion. Once sufficient coverage is achieved through the narrower annulus portion, the cladding can be de-swelled so as to switch the preferential flow of fluids to the wider annulus portion and sufficient coverage in the wider annulus portion can then be achieved.

Figure 3:
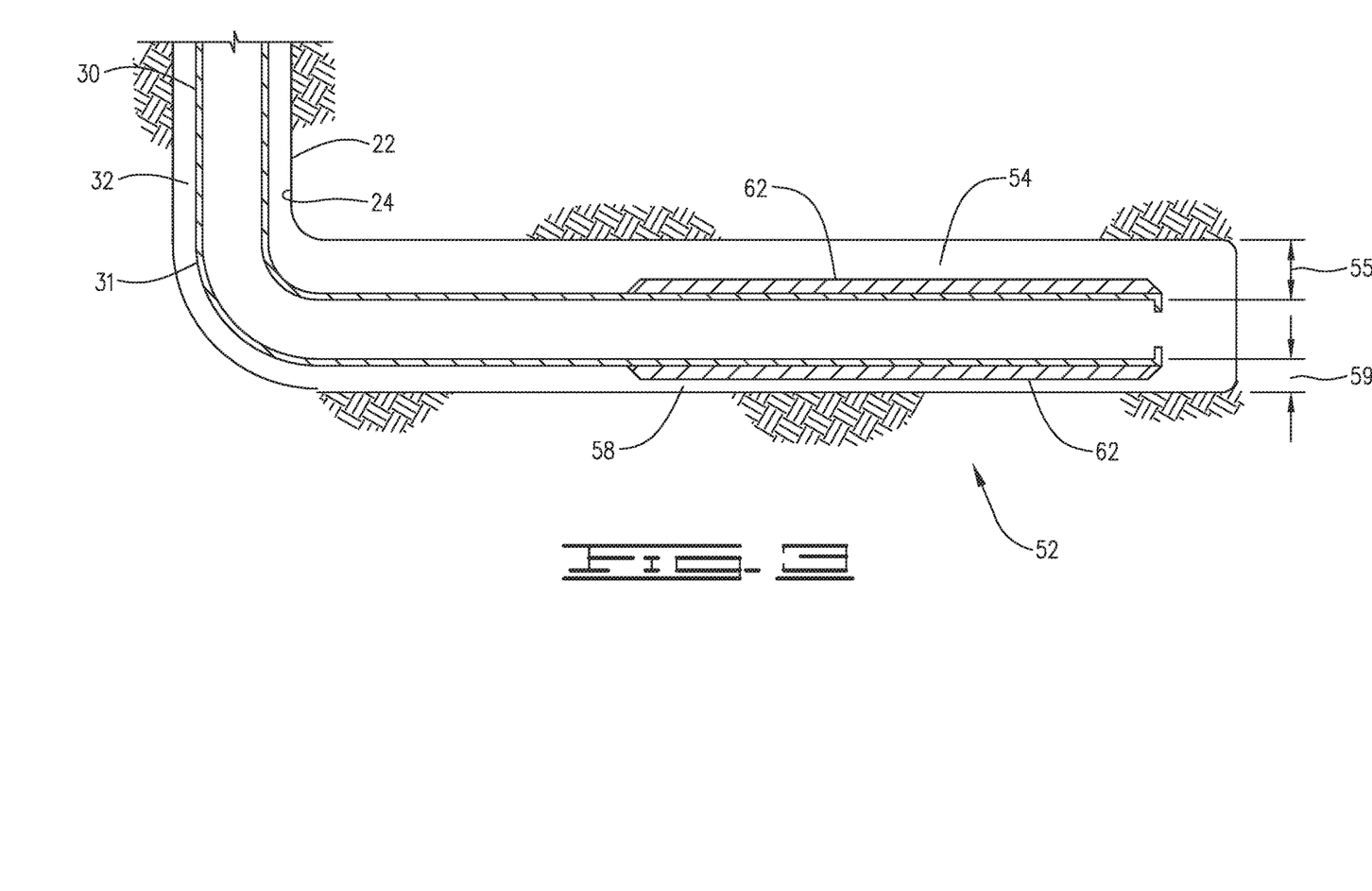
FIG. 3 is a schematic representation of a wellbore containing a drilling pipe wherein there is a standoff section.

The above process can be better understood with reference to FIGS. 3-7. In FIG. 3, a simplified schematic drawing of wellbore 22 containing a pipe 30 is illustrated. Pipe 30 has a smaller radius than the wellbore, thus, an annulus 32 is formed between the exterior 31 of the pipe and the wellbore wall 24. A portion of the exterior 31 of pipe 30 is encased in a cladding 62 at standoff section 52. As can be seen from FIG. 3, width 55 of wider annulus portion 54 is greater than width 59 of narrower annulus portion 58. Because of this, there is a preferential flow of fluids through wider annulus portion 54 over—or relative to—narrower annulus portion 58. In other words, there will be larger flow rate of fluids through wider annulus portion 54 relative to the flow rate of fluids through narrower annulus portion 58.

Cladding 62 is configured to swell in the presence of a first agent or swelling agent. Generally, cladding 62 can be a swellable polymer which is strong and/or stiff enough not to erode in the flow of fluids. The swellable polymer can be composited with other materials to attain the desired swelling, stiffness and/or strength. By "swell," "swelling" or "swellable," it is meant that the polymer increases its volume upon exposure to a swelling agent (for example, carbon dioxide, carbonic acid and/or hydrochloric acid and acid generated through hydrolysis of an ester). Typically, the resulting swelled volume is greater than would be expected by mere linear addition of the polymer volume and the volume of the swelling agent. Often the swelling can result in at least a 5% increase in the polymer volume and can result in at least a 10% increase, at least a 20% increase, or at least a 50% increase in the polymer volume. Preferably, the polymer will be an acid swellable polymer meaning that it at least swells upon exposure to acid, carbon dioxide or other fluid with a pH of less than 7, or no greater than 6.

Typically, the swellable polymer is one that, after being swelled with the swelling agent, can then be de-swelled with a second agent or de-swelling agent. By "de-swell," "de-swelling" or "de-swellable" it is meant that the polymer decreases its volume upon exposure to a de-swelling agent (for example, for an acid swellable polymer, the de-swelling agent could be a basic fluid, such as cement or another fluid with a pH greater than 7, or of at least 8, or at least 9). Typically, the polymer will de-swell to near its original volume upon exposure to the de-swelling agent.

As indicated above, the swellable polymer can be an acid swellable polymer in some embodiments. For example, the acid swellable polymer can be a combination of hydrophilic monomers (acid responsive monomers such as various amino alkyl acrylate/methacrylates, vinyl pyridine, etc.) and hydrophobic monomers (e.g. alkyl acrylate/methacrylate, styrene, etc.) wherein the monomers are crosslinked with a suitable crosslinker (e.g. divinyl, trivinyl, tetravinyl, etc.).

Other suitable polymers can be derived from a perfluoro vinyl monomer. Additionally, the polymer can be derived from at least one mono-vinyl monomer and at least one divinyl monomer. The monovinyl monomer can be selected from the group consisting of: alkyl acrylates, alkyl methacrylates, cyclohexyl acrylates, cyclohexyl methacrylates, aryl acrylates, aryl methacrylates, aminoalkyl acrylates, aminoalkyl methacrylates, perfluoroalkyl acrylates, perfluoroalkyl methacrylates, alkyl vinyl ethers, perfluoroalkyl vinyl ethers, styrene, acrylonitrile, 2-vinylpyridine, 4-vinylpyridine, acrylic acid, methacrylic acid, and vinyl acetate. The divinyl monomer can be selected from the group consisting of: alkane diol diacrylates, alkane diol dimethacrylates, alkene glycol diacrylates, alkene glycol dimethacrylates, alkane diol divinyl ethers, alkene glycol divinylethers, divinylbenzene, allyl methacrylate, and allyl acrylate. More specifically, the carbon dioxide swellable polymer can be a fluorinated acrylate polymer produced from 1H,1H,2H,2H-perfluorooctyl acrylate and ethylene dimethacrylate monomers. Other types of vinyl monomers may be used to the extent that the resulting polymer is still swellable, as defined above.

Figure 4:
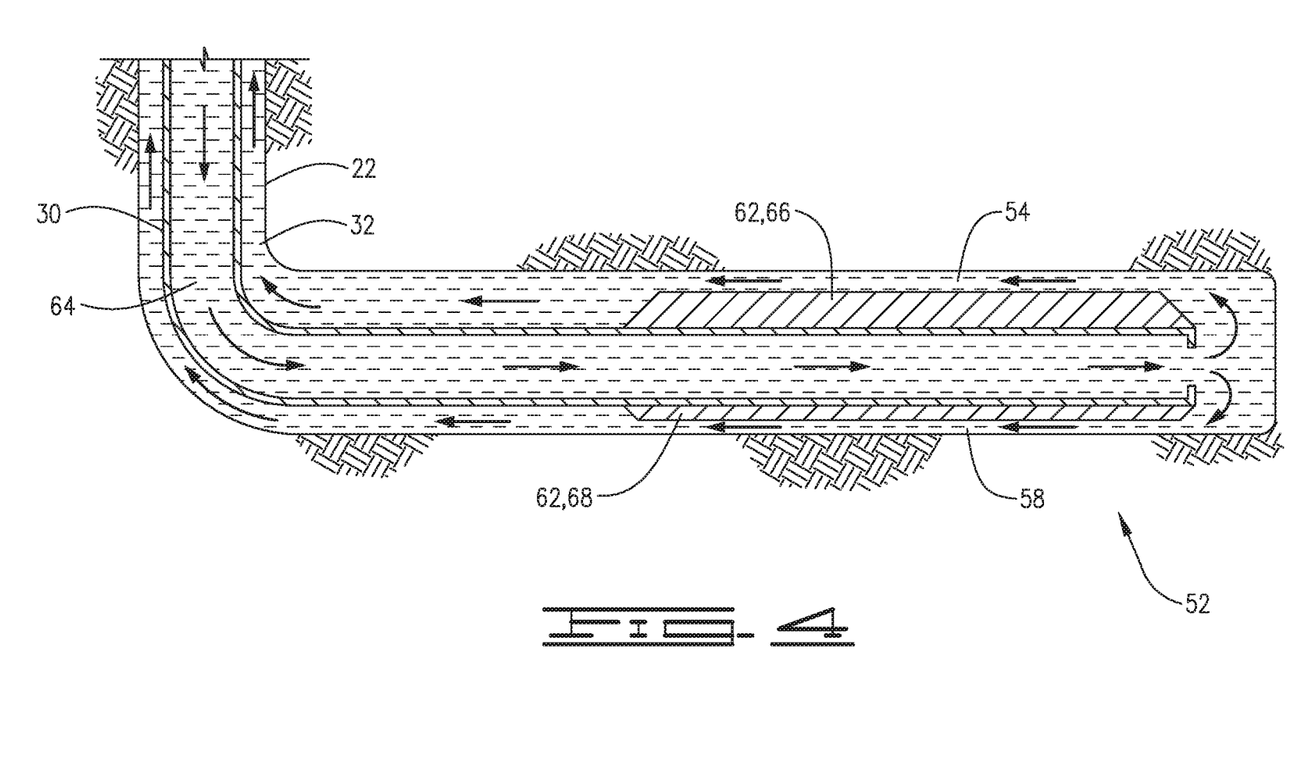
FIG. 4 is a schematic representation of the wellbore of FIG. 3 showing the introduction of a swelling agent.

Turning now to FIG. 4, a swelling agent 64 is circulated downhole. Typically, swelling agent 64 is passed through pipe 30 and released at the downhole end of the pipe into the wellbore to pass uphole through annulus 32, as shown. However, in some embodiments, reverse circulation techniques can be used so that swelling agent 64 flows in the opposite direction—down annulus 32 and then up through pipe 30. The contact of swelling agent 64 with cladding 62 causes cladding 62 to swell. Because of the prudential flow through wider annulus portion 54, cladding 66 in wider annulus portion 54 has a greater exposure to the swelling agent and thus swells more than cladding 68 in narrower annulus portion 58. Thus, the preferential flow through wider annulus portion 54 is reduced. Generally, flow of swelling agent 64 is continued at least until there is no preferential flow through wider annulus portion 54 or until the preferential flow has shifted so that there is a preferential flow through narrower annulus portion 58 over—or relative to—wider annulus portion 54. In other words, there will be at least equal flow rates of fluids in wider annulus portion 54 and narrower annulus portion 58, or there will be a larger flow rate of fluids through narrower annulus portion 58 relative to the flow rate of fluids through wider annulus portion 54.

Swelling agent 64 can be any suitable fluid that results in a swelling of cladding 62 without adversely affecting its structural integrity on pipe 30. For example, if the cladding is an acid swellable polymer, the swelling agent can be carbon dioxide, a carbon dioxide generating fluid, carbonic acid and/or hydrochloric acid. Typically, the carbon dioxide generating fluid will generate the carbon dioxide in situ in the wellbore. In some embodiments, the swelling agent can be an acid generating fluid such as an acid generated by the hydrolysis of an ester. In such embodiments, the acid can be generated in situ in the wellbore. Typically, for acid swellable polymers, the swelling agent will have a pH of less than 7, and in some cases, of 6 or less.

Figure 5:
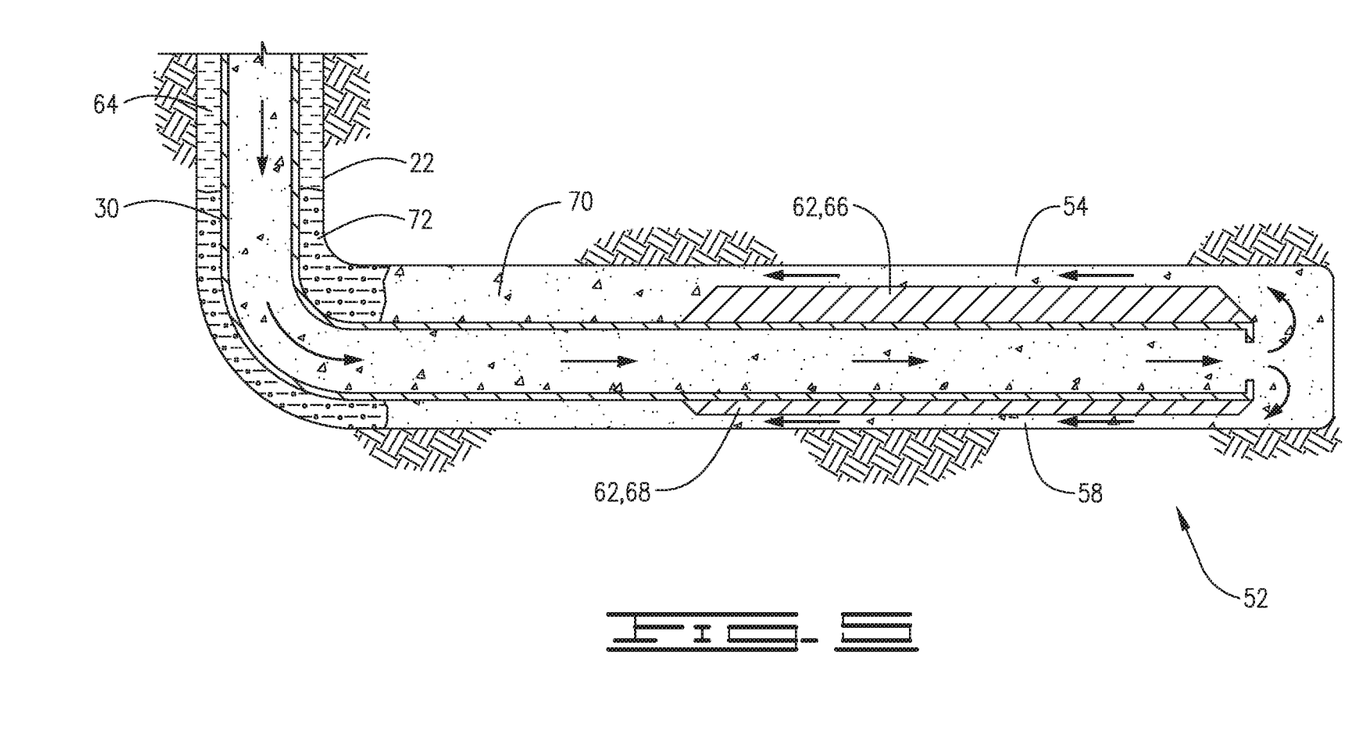
FIG. 5 is a schematic representation of the wellbore of FIGS. 3 and 4 showing the introduction of a well-treatment fluid.

Once the preferential flow has been switched, as described above, well-treatment fluid 70 can be introduced downhole as illustrated in FIG. 5. Optionally, the well-treatment fluid can be preceded by a spacer fluid 72 so as to prevent interaction of the well-treatment fluid with the swelling agent. Well-treatment fluid can be any fluid used in a downhole operation where a preferential flow of the well-treatment fluid through the annulus could adversely affect the downhole operation. For example, the well-treatment fluid can be a cement or a drilling mud.

Once there has been adequate flow of the treatment fluid to achieve complete and/or uniform flow or coverage of treatment fluid through narrower annulus portion 58, the de-swelling agent, or second agent, can be introduced to return preferential flow to being through wider annulus portion 54.

In some embodiments, such as illustrated in FIG. 6, the treatment fluid serves as the de-swelling agent. For example, where an acid swelling polymer is used as cladding 62, the well-treatment fluid can serve as the de-swelling agent. For example, cement has a pH greater than 7 and can serve as a de-swelling agent for acid swelling polymers because of its basic nature. Thus once the swelling agent has been introduced in well-casing cementing operations, the flow of cement 70 through the annulus is first equally through both narrower annulus portion 58 and wider annulus portion 54 or preferentially through narrower annulus portion 58, as shown in FIG. 5. Then as illustrated in FIG. 6, the continued flow of cement 70 through annulus 32 results in the gradual de-swelling of cladding 66 and cladding 68 so that preferential flow of cement 70 is re-established in wider annulus portion 54. This re-establishing of preferential flow in wider annulus portion 54 results in uniform and complete coverage of the cement throughout annulus 32, including wider annulus portion 54 and narrower annulus portion 58. Thus, the objective of full cement coverage and support for the pipe 30—in this application, a casing—is achieved.

Figure 7:
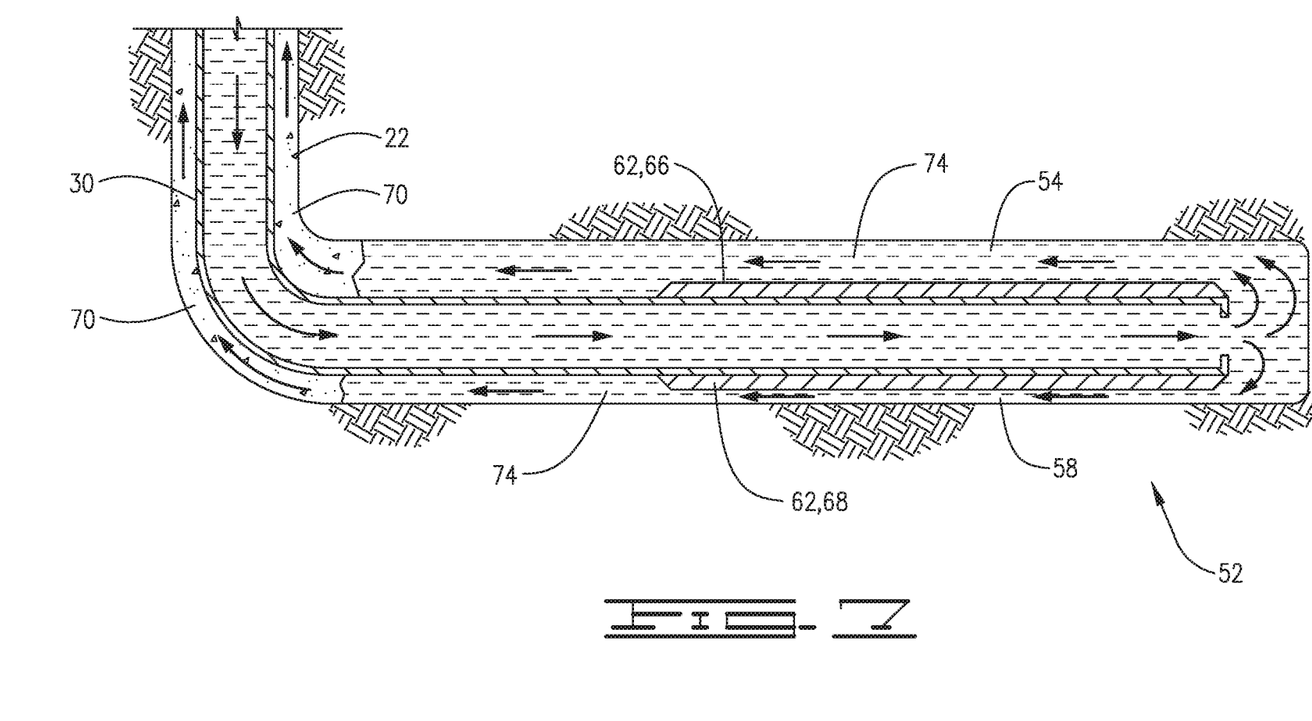
FIG. 7 is a schematic representation of the wellbore of FIGS. 3-5 showing an embodiment where the well-treatment fluid is followed by a de-swelling agent.
Figure 11:
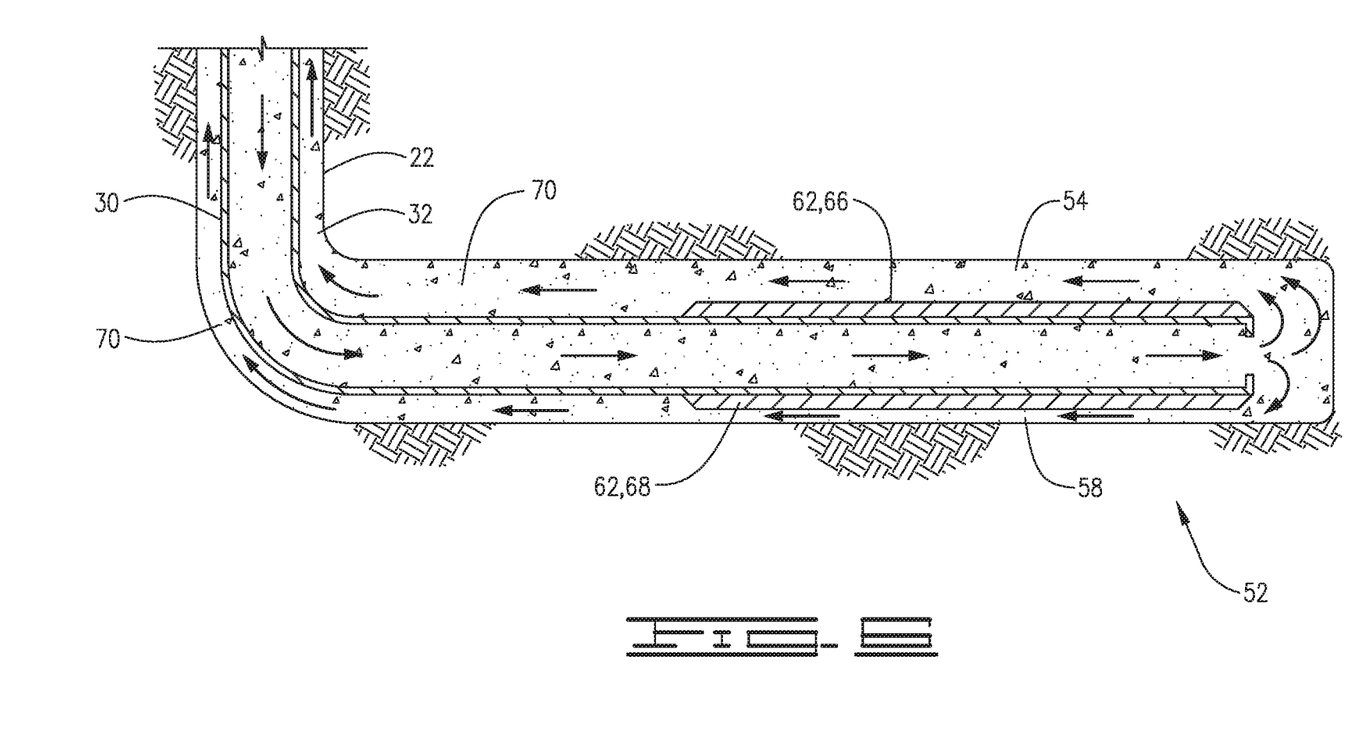

Turning now to FIG. 7, another embodiment for de-swelling is illustrated which might be used for mud circulation operations, for example. In this embodiment, de-swelling agent 74 is separate from well-treatment fluid 70. De-swelling agent 74 can be introduced downhole behind well-treatment fluid 70 so that cladding 62 is de-swelled after the treatment fluid has passed through standoff section 52. A spacer fluid can be used between the de-swelling agent and the well-treatment fluid, as needed.

De-swelling agent 74 can be any suitable fluid that results in de-swelling of cladding 62 without adversely affecting its structural integrity on pipe 30. For example, if the cladding is an acid-swellable polymer, the de-swelling agent can be a basic fluid having a pH greater than 7, or at least 8 or at least 9. For example, the de-swelling agent can be a hydroxide containing fluid.

In some applications, it may be desirable to subsequently introduce the well-treatment fluid after the de-swelling agent. Further, it may be desirable to alternately repeat the steps of introducing swelling agent and introducing de-swelling agent between introduction of drilling mud. That is, the de-swelling agent is followed by well-treatment fluid, which is followed by a swelling agent and then well-treatment fluid and further de-swelling agent, etc. In this manner, the preferential flow can be switched back and forth between the wider annulus portion and narrower annulus portions for intermediate treatment of the well-treatment fluid.

The above method, its steps, and systems incorporating the method can be better understood by the following examples, which support and illustrate the process.

EXAMPLES

An acid swellable polymer was synthesized, tested for swelling in an acidic environment, and tested for de-swelling in a basic environment. The polymer was synthesized from an N,N-dimethylaminoethyl methacrylate (DMAEMA) monomer and ethylene glycol dimethacrylate (EDGMA) as a cross-linker synthesized using bulk polymerization technique with azobisisobutyronitrile (AIBN), which can interact with acid. DMAEMA has a tertiary amine group which is stable in nature. The structural formulas for DMAEMA and EDGMA are shown below.

DMAEMA

-continued

EDGMA

The polymer was synthesized with a 3% crosslinking density. The monomer and cross-linker were mixed together in a reaction vessel and then AIBN (1 mole-% based on total moles of DMAEMA and EDGMA) was added to the mixture. The polymerization mixture was purged with $N_2$ for 15 minutes and then sealed. The reaction was carried out at 158° F. (70° C.) for 20 hours. The cross-linked polymer was washed with methanol repeatedly in order to remove unreacted monomer.

The swelling efficiency of the resulting polymer was evaluated in a test solution. The test solution was made of propylene carbonate and water. $CO_2$ was generated in-situ when propylene carbonate came in contact with the water. The experiment was conducted at atmospheric pressure and room temperature. The polymer swelled to over four times its initial volume upon exposure to the test solution.

After swelling, the polymer was exposed to a high pH environment to test de-swelling. The high pH environment was achieved by exposing the polymer to a high pH solution comprised of sodium hydroxide solution (pH 10). The polymer was observed to de-swell by about 20% of its swelled size. The de-swelling tendency was limited because the consumed high pH solution was not replenished. In actual application, further de-swelling can be achieved by continued application of incoming de-swelling agent, such as cement in casing cementing operations.

Next, the above polymer was used to test whether an exposed area of polymer-clad substrate swells more relative to the less exposed area. A metal coupon was coated with the polymer. The coating was achieved by dipping the metal coupon in polymerization solution and allowing the polymerization to be carried out in the presence of the coupon. After polymerization, the extra polymer was removed from the coupon. The polymer had excellent binding to the metal coupon.

The polymer-coated metal coupon was placed in the same type test solution (propylene carbonate and water) as used above to test the polymer swelling. Due to the weight of the coated coupon, it sunk to the bottom, thus providing an area with greater exposure to the test solution (the top of the coupon) and an area with relatively less exposure to the test solution (the bottom of the coupon).

Significant polymer swelling was observed on the top side of the coupon, which had higher exposure to the test solution. Negligible or no swelling was observed on the bottom side of the coupon where access to the test solution was relatively minimal.

This experiment demonstrates that the amount of swelling and de-swelling are dependent on the area of exposure to the low and high pH fluids respectively. In a wellbore, wider annular regions will have higher exposure and thus the swelling of polymer (coated on casing) will be higher on the wider side causing a blockage of this flow path. Consequently, the narrower side of the annulus will have increased access to circulating fluid.

The above disclosure is exemplified by a method which results in uniform distribution of a fluid through an annulus between a pipe and a wellbore wall, primarily when there is a preferential flow in one side of the annulus relative to another side of the annulus. Generally, the method can comprise:

provide the pipe in a wellbore defined by the wellbore wall, wherein the annulus is formed between the pipe and wellbore wall, and a section of the pipe has an exterior facing the wellbore wall, wherein the exterior of the section is coated in a cladding; and introducing a first agent into the annulus, wherein the first agent is configured to cause swelling of a cladding on the exterior of the section of the pipe.

In many embodiments, when the pipe is provided in the wellbore, the annulus has a first portion adjacent to a first side of the section and a second portion adjacent to a second side of the section such that the first portion has a larger width than the second portion so that fluids preferentially flow through the first portion relative to the second portion. In such embodiments, the first agent can be configured to cause swelling of a cladding such that the swelling results in shifting preferential flow such that fluids flow at least equally through the first portion and second portion or preferentially flow through the second portion relative to flowing through the first portion.

Some of the embodiments further involve introducing a second agent into the annulus, wherein the second agent is configured to reduce swelling of the cladding such that fluids preferentially flow through the first portion of the annulus relative to flowing through the second portion of the annulus.

For example, in some embodiments, the pipe is a casing and the second agent is cement composition. When introduction of the cement composition into the annulus starts, the swelling of the cladding causes the cement to preferentially flow through the second portion of the annulus relative to flowing through the first portion of the annulus, and the cement composition causes reduction in swelling of the cladding so that preferential flow shifts to the first portion of the annulus relative to the second portion of the annulus, thus resulting in uniform distribution of cement through the annulus.

As another example, in some embodiments, the pipe is part of a drill string. In such embodiments, the method further comprises introducing drilling mud into the annulus after introduction of the first agent into the annulus such that the drilling mud preferentially flows through the second portion of the annulus relative to the first portion of the annulus. After the drilling mud, the second agent can be introduced into the annulus. The second agent is configured to reduce swelling of the cladding such that fluids preferentially flow through the first portion of the annulus relative to the second portion of the annulus. In these embodiments, drilling mud can be further introduced into the annulus after introduction of the second agent into the annulus such that drilling mud preferentially flows through the first portion of the annulus relative to the second portion of the annulus. Such embodiments can include alternately repeating the steps of introducing the first agent and introducing the second agent between introduction of drilling mud into the annulus so as to achieve uniform flow of drilling mud through the annulus during drilling.

Further, some embodiments are specifically directed to a method of cementing a casing in a wellbore defined by a wellbore wall. The method comprises:

introducing the casing into the wellbore such that an annulus is formed between the casing and the wellbore wall with a section of the casing having an exterior facing the wellbore wall, and wherein after introduction, the section of the casing has a first side farther from the wellbore wall than a second side of the casing opposing the first side so that a first portion of the annulus adjacent to the first side of the casing has a larger width than a second portion of the annulus adjacent to the second side of the casing which results in fluids preferentially flowing through the first portion of the annulus relative to the second portion of the annulus;

introducing a first agent into the annulus, wherein the first agent is configured to cause swelling of a cladding on the exterior of the section of the casing such that the swelling results in fluids flowing at least equally through the first portion and second portion or preferentially flowing through the second portion of the annulus relative to the first portion of the annulus; and introducing a cement composition into the annulus, wherein at least when introduction of the cement starts, the cement composition preferentially flows through the second portion of the annulus relative to the first portion of the annulus, and the cement composition causes reduction in swelling of the cladding so that preferential flow shifts to the first portion of the annulus relative to the second portion of the annulus, thus resulting in uniform distribution of cement through the annulus.

In any of the above embodiments, the cladding can be formed from a swellable polymer. Also, the swellable polymer can be configured to swell when in contact with acid and the swellable polymer's swelling can be reduced when the swellable polymer is in contact with a base. Accordingly, in such embodiments, the first agent can have a pH less than 7, and the second agent or cement can have a pH of more than 7.

Also, in the above embodiments, the cladding can be placed on the section of casing prior to introduction of the casing into the wellbore. Further, the first agent, second agent, cement and/or drilling fluid can be introduced downhole using pumping equipment.

Therefore, the present compositions and methods are well adapted to attain the ends and advantages mentioned, as well as those that are inherent therein. The particular examples disclosed above are illustrative only, as the present treatment additives and methods may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered or modified, and all such variations are considered within the scope and spirit of the present treatment additives and methods. While compositions and methods are described in terms of "comprising," "containing," "having," or "including" various components or steps, the compositions and methods can also, in some examples, "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of cementing a casing in a wellbore defined by a wellbore wall, the method comprising:

introducing the casing into the wellbore such that an annulus is formed between the casing and the wellbore wall with a section of the casing having an exterior facing the wellbore wall, and wherein after introduction, the section of the casing has a first side farther from the wellbore wall than a second side of the casing opposing the first side so that a first portion of the annulus adjacent to the first side of the casing has a larger width than a second portion of the annulus adjacent to the second side of the casing;

introducing a first agent into the annulus, wherein the first agent preferentially flows through the first portion of the annulus relative to the second portion of the annulus, and wherein the first agent is configured to cause swelling of a cladding on the exterior of the section of the casing;

initially introducing a cement composition into the annulus wherein the swelling of the cladding results in the cement composition, at least when introduction of the cement composition starts, flowing equally through the first portion and the second portion or preferentially flowing through the second portion of the annulus relative to the first portion of the annulus, and wherein the cement composition causes reduction in swelling of the cladding so that preferentially flowing for the cement composition changes to the first portion of the annulus relative to the second portion of the annulus; and subsequent to initially introducing the cement composition, continuing to introduce the cement composition such that the cement composition preferentially flows to the first portion of the annulus relative to the second portion of the annulus.

2. The method of claim 1, wherein the cladding is formed from a swellable polymer.

3. The method of claim 2, wherein the swellable polymer swells when in contact with acid and the swelling is reduced when the swellable polymer is in contact with a base.

4. The method of claim 3, wherein the first agent has a pH less than 7, and the cement composition has a pH of more than 7.

5. The method of claim 4, wherein the cladding is placed on the section of casing prior to introduction of the casing into the wellbore.

6. The method of claim 5, wherein the first agent and the cement composition are introduced downhole using pumping equipment.

7. The method of claim 1, wherein the cladding is on the exterior of the casing at the first side and the second side.

8. The method of claim 7, wherein the cladding on the first side opposes the cladding on the second side.

9. The method of claim 8, wherein the cladding is placed on the section of casing prior to introduction of the casing into the wellbore.

10. The method of claim 9, wherein the cladding is formed from a swellable polymer.

11. The method of claim 10, wherein the swellable polymer swells when in contact with acid and the swelling is reduced when the swellable polymer is in contact with a base.

12. The method of claim 11, wherein the first agent has a pH less than 7, and the cement composition has a pH of more than 7.

13. The method of claim 12, wherein the first agent is a fluid that generates acid in situ within the borehole.

14. The method of claim 13, wherein the first agent and the cement composition are introduced downhole using pumping equipment.

* * * * *